(12) United States Patent
Aron et al.

(10) Patent No.: US 11,775,485 B2
(45) Date of Patent: Oct. 3, 2023

(54) CONCURRENT ACCESS AND TRANSACTIONS IN A DISTRIBUTED FILE SYSTEM

(71) Applicant: Cohesity, Inc., San Jose, CA (US)

(72) Inventors: Mohit Aron, Saratoga, CA (US); Ganesha Shanmuganathan, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 188 days.

(21) Appl. No.: 17/240,729

(22) Filed: Apr. 26, 2021

(65) Prior Publication Data

US 2021/0342312 A1 Nov. 4, 2021

Related U.S. Application Data

(63) Continuation of application No. 16/296,707, filed on Mar. 8, 2019, now Pat. No. 11,023,425, which is a continuation of application No. 15/628,484, filed on Jun. 20, 2017, now Pat. No. 10,275,469, which is a continuation of application No. 14/524,979, filed on Oct. 27, 2014, now Pat. No. 9,697,227.

(51) Int. Cl.
*G06F 16/18* (2019.01)
*G06F 16/182* (2019.01)
*G06F 16/176* (2019.01)
*G06F 16/10* (2019.01)

(52) U.S. Cl.
CPC .......... *G06F 16/1865* (2019.01); *G06F 16/10* (2019.01); *G06F 16/1767* (2019.01); *G06F 16/182* (2019.01)

(58) Field of Classification Search
CPC .... G06F 16/10; G06F 16/182; G06F 16/1865; G06F 16/1767

USPC ................. 707/688, 822, 826, 827
See application file for complete search history.

(56) References Cited

U.S. PATENT DOCUMENTS

| 5,218,695 A | 6/1993 | Noveck |
| 5,454,108 A | 9/1995 | Devarakonda |

(Continued)

FOREIGN PATENT DOCUMENTS

WO 2011023134 3/2011

OTHER PUBLICATIONS

Christopher K. Hess/E Roy H. Campbell—"An application of a context-aware file system"—Published in: Journal Personal and Ubiquitous Computing archive—vol. 7 Issue 6, Dec. 2003—pp. 339-352—Springer-Verlag London, UK.

(Continued)

*Primary Examiner* — Phong H Nguyen
(74) *Attorney, Agent, or Firm* — Van Pelt, Yi & James LLP

(57) ABSTRACT

According to one embodiment of the present disclosure, a first set of file system objects included in performing a requested file system operation is identified in response to a request to perform a file system operation. An update intent corresponding to the requested file system operation is inserted into a data structure associated with each identified file system object. Each file system object corresponding to the corresponding data structure is modified as specified by the update intent in that data structure. After modifying the file system object corresponding to the corresponding data structure, the update intent is removed from that data structure.

20 Claims, 8 Drawing Sheets

(56) References Cited

U.S. PATENT DOCUMENTS

| | | | |
|---|---|---|---|
| 5,537,645 A * | 7/1996 | Henson | G06F 16/1774 710/200 |
| 5,613,105 A | 3/1997 | Zbikowski | |
| 5,642,501 A | 6/1997 | Doshi | |
| 5,940,841 A | 8/1999 | Schmuck | |
| 6,058,400 A | 5/2000 | Slaughter | |
| 6,144,999 A | 11/2000 | Khalidi | |
| 6,163,856 A | 12/2000 | Dion | |
| 6,772,155 B1 | 8/2004 | Stegelmann | |
| 7,054,960 B1 * | 5/2006 | Bezbaruah | G06F 11/2071 710/33 |
| 7,340,743 B1 * | 3/2008 | Anural | G06F 9/526 710/36 |
| 7,487,228 B1 | 2/2009 | Preslan | |
| 7,657,796 B1 | 2/2010 | Kaiser | |
| 7,689,599 B1 | 3/2010 | Shah | |
| 7,730,258 B1 | 6/2010 | Smith | |
| 7,899,791 B1 | 3/2011 | Gole | |
| 7,962,689 B1 * | 6/2011 | Kazar | G06F 3/0643 711/100 |
| 8,255,590 B2 | 8/2012 | Tomikura | |
| 8,620,640 B2 | 12/2013 | Sandorfi | |
| 8,655,848 B1 | 2/2014 | Leverett | |
| 8,863,297 B2 | 10/2014 | Sharma | |
| 8,972,345 B1 | 3/2015 | Aguilera | |
| 9,274,710 B1 | 3/2016 | Oikarinen | |
| 2002/0188697 A1 | 12/2002 | O'Connor | |
| 2002/0196744 A1 | 12/2002 | O'Connor | |
| 2003/0158834 A1 | 8/2003 | Sawdon | |
| 2004/0105332 A1 | 6/2004 | Crow | |
| 2004/0133573 A1 | 7/2004 | Miloushev | |
| 2005/0010620 A1 | 1/2005 | Silvers | |
| 2005/0038803 A1 | 2/2005 | Edwards | |
| 2005/0065986 A1 | 3/2005 | Bixby | |
| 2005/0251500 A1 | 11/2005 | Vahalia | |
| 2006/0136509 A1 * | 6/2006 | Pannala | G06F 16/2379 707/999.203 |
| 2007/0005661 A1 | 1/2007 | Yang | |
| 2007/0276878 A1 | 11/2007 | Zheng | |
| 2008/0091680 A1 | 4/2008 | Eshel | |
| 2009/0271412 A1 | 10/2009 | Lacapra | |
| 2010/0082547 A1 * | 4/2010 | Mace | G06F 16/1748 707/648 |
| 2010/0114849 A1 | 5/2010 | Kingsbury | |
| 2010/0241654 A1 | 9/2010 | Wu | |
| 2011/0153697 A1 | 6/2011 | Nickolov | |
| 2012/0036161 A1 | 2/2012 | Lacapra | |
| 2012/0089735 A1 | 4/2012 | Attaluri | |
| 2012/0101991 A1 | 4/2012 | Srivas | |
| 2012/0259820 A1 | 10/2012 | Patwardhan | |
| 2013/0097136 A1 | 4/2013 | Goldberg | |
| 2013/0179480 A1 | 7/2013 | Agarwal | |
| 2014/0025877 A1 | 1/2014 | Talagala | |
| 2014/0082145 A1 | 3/2014 | Lacapra | |
| 2014/0136805 A1 | 5/2014 | Shah | |
| 2014/0173426 A1 | 6/2014 | Huang | |
| 2014/0258242 A1 | 9/2014 | Kanfi | |
| 2015/0012571 A1 | 1/2015 | Powell | |
| 2015/0066845 A1 | 3/2015 | Beard | |
| 2015/0066846 A1 | 3/2015 | Beard | |
| 2015/0277969 A1 | 10/2015 | Strauss | |
| 2015/0278243 A1 | 10/2015 | Pradeep | |
| 2015/0278397 A1 | 10/2015 | Hendrickson | |
| 2015/0280959 A1 | 10/2015 | Pradeep | |
| 2015/0356110 A1 | 12/2015 | Lin | |
| 2015/0356116 A1 | 12/2015 | Lin | |
| 2015/0379009 A1 | 12/2015 | Reddy | |
| 2016/0078052 A1 | 3/2016 | Srivas | |
| 2016/0283501 A1 | 9/2016 | König | |

OTHER PUBLICATIONS

International Search Report and Written Opinion for corresponding International Application No. PCT/US15/57320; dated Feb. 10, 2016 (18 pages).

International Search Report and Written Opinion for corresponding International Application No. PCT/US15/57320; dated Mar. 7, 2016 (16 pages).

Jaegeuk Kim, Heeseung Jo, Hyotaek Shim, Jin-Soo Kim, and Seungryoul Maeng—"Efficient Metadata Management or Flash File Systems" Published in: Object Oriented Real-Time Distributed Computing (ISORC), 2008 11th IEEE International Symposium on May 5-7, 2008—pp. 535-540.

* cited by examiner

CONCURRENT ACCESS AND TRANSACTIONS IN A DISTRIBUTED FILE SYSTEM

This application is a continuation of U.S. patent application Ser. No. 16/296,707, entitled CONCURRENT ACCESS AND TRANSACTIONS IN A DISTRIBUTED FILE SYSTEM filed Mar. 8, 2019 which is incorporated herein by reference for all purposes, which is a continuation of co-pending U.S. patent application Ser. No. 15/628,484 entitled CONCURRENT ACCESS AND TRANSACTIONS IN A DISTRIBUTED FILE SYSTEM filed Jun. 20, 2017, now U.S. Pat. No. 10,275,469, which is a continuation of U.S. patent application Ser. No. 14/524,979, now U.S. Pat. No. 9,697,227 entitled CONCURRENT ACCESS AND TRANSACTIONS IN A DISTRIBUTED FILE SYSTEM filed Oct. 27, 2014, both of which are incorporated herein by reference for all purposes.

BACKGROUND

Field

Embodiments presented herein generally relate to distributed computing. More specifically, embodiments presented herein provide a high-performance distributed file system that provides concurrent access and transaction safety.

Description of the Related Art

A distributed computing network system includes multiple computer systems which interact with one another to achieve a common goal. The computer systems are networked to form a cluster. Computer systems in the cluster may share different resources, such as data, storage, processing power, and the like.

An example of a distributed computing network system is a secondary storage environment. A cluster of secondary storage systems may provide services for primary storage systems. For instance, secondary storage systems may provide backup, copy, and test and development services for data residing in primary storage. The secondary storage cluster can expose data backed up from the primary storage system to clients systems, which can read or write data to the file system.

A distributed file system needs to support concurrent access to file system objects, e.g., files and directories, while also maintaining a consistent state. When different nodes in the cluster may access the file system concurrently (e.g., in response to read and write requests sent by clients), it is important that the file system remain consistent. That is, updates to the file system performed by one node are visible to other nodes of the cluster. Further, consistency requires tolerance for node failures, such that if a node fails while performing an update to the file system, the incomplete file system operations transactions need to be either completed or aborted.

SUMMARY

One embodiment presented herein provides a method for performing a transaction in a distributed file system. The method generally includes identifying a first set of file system objects modified in performing a file system operation in response to a request to perform the file system operation. The method also includes inserting an update intent corresponding to the requested file system operation into an inode associated with each identified file system object. The update intent specifies an ordered sequence of inodes associated with the requested file system operation. For each inode, (i) either the inode or the file system object corresponding to the inode is modified according to the update intent in that inode, and (ii) the update intent is removed from that inode after the modification.

Another embodiment presented herein provides a computer-readable medium storing instructions that, when executed by a processor, cause the processor to perform an operation for performing a transaction in a distributed file system. The operation itself generally includes identifying a first set of file system objects modified in performing a file system operation in response to a request to perform the file system operation. The operation also includes inserting an update intent corresponding to the requested file system operation into an inode associated with each identified file system object. The update intent specifies an ordered sequence of inodes associated with the requested file system operation. For each inode, (i) either the inode or the file system object corresponding to the inode is modified according to the update intent in that inode, and (ii) the update intent is removed from that inode after the modification.

Another embodiment provides a system having a processor and a memory storing program code. The program code, when executed on the processor, performs an operation for performing a transaction in a distributed file system. The operation itself generally includes identifying a first set of file system objects modified in performing a file system operation in response to a request to perform the file system operation. The operation also includes inserting an update intent corresponding to the requested file system operation into an inode associated with each identified file system object. The update intent specifies an ordered sequence of inodes associated with the requested file system operation. For each inode, (i) either the inode or the file system object corresponding to the inode is modified according to the update intent in that inode, and (ii) the update intent is removed from that inode after the modification.

Another embodiment provides a method for locking entities to be modified in an operation in a distributed file system. The method generally includes receiving a request to perform a file system operation. The request specifies one or more file system objects to be modified in a distributed file system managed by a cluster of nodes. A node-specific lock is requested on each of the file system objects. The node-specific lock prevents other nodes in the cluster from accessing the locked file system objects during the file system operation. Upon receiving the node-specific locks on the file system objects, a process-specific lock is requested from a process-specific lock manager on each of the file system objects. The process-specific lock prevents other local processes from accessing the file system objects.

DETAILED DESCRIPTION OF THE PREFERRED EMBODIMENTS

Figure 1:
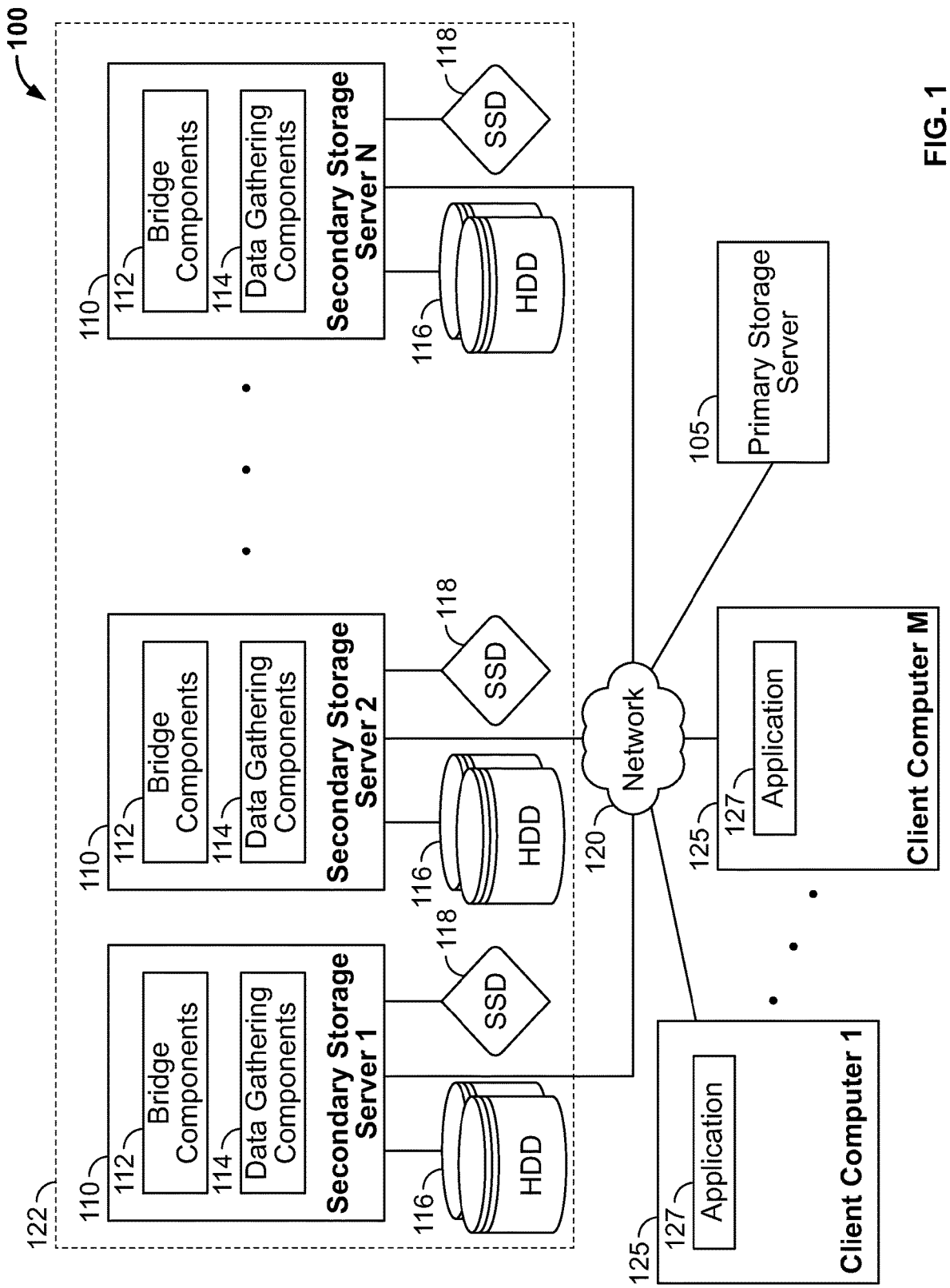
FIG. 1 illustrates an example computing environment, according to one embodiment.

Embodiments presented herein provide a high-performance distributed file system. The distributed file system is stored on a cluster of computing nodes. Each node can read and write to any file system object (e.g., a file or directory) and perform common file system operations, such as copy, rename, delete, etc., in response to requests sent by clients. For example, in one embodiment, the distributed file system disclosed herein may be exposed to a client as an NFS mount point. In such case, the distributed file system manages concurrency and consistency issues transparently to an NFS client. Specifically, nodes of the cluster can perform file system operations requested by multiple clients concurrently and each node can process multiple requests concurrently. Further, the nodes in the cluster ensure that each file system transaction requested by a client that updates or modifies multiple file system objects is either completed or aborted.

In one embodiment, a two-level locking scheme allows file system entities (e.g., files and directories of the file system) to be accessed concurrently. Specifically, when a node in the distributed cluster receives a request to access the file system (e.g., to modify data, read data, etc.), the node requests a node-level lock, referred to as a "ticket," from a ticket service, for each file system object associated with a requested file system operation (e.g., a set of inodes). The ticket service is a distributed lock management service that issues tickets for file system entities to nodes of the cluster. A ticket provides a node with shared or exclusive access to a given file system object. Once a ticket is obtained, the node can access files associated with that ticket. In addition to the cluster-level lock, i.e., the ticket, a process operating on the file also requests a process-wide lock for each file system object associated with the requested file system operation. A process-wide lock provides a process with shared or exclusive access to a given entity on that node. Once tickets and process-wide locks are obtained for each associated file system object, the node may perform a requested file system operation on the locked objects. Examples of operations include create operations (where the node creates a file or directory) or delete operations (where the node deletes a file or directory from the file system). The tickets and locks allow the nodes to perform file system operations safely and concurrently. For example, when acting as an NFS mount point, the process on the nodes can perform any file system operations requested by an NFS client.

In addition to addressing concurrency issues via the two-tiered locking mechanism discussed above, the distributed file system also supports transactions such that if a file system operation modifies multiple entities, the file system does not become inconsistent should a node performing that operation crash before the changes can be completed. In one embodiment, a process operating on the file stores an update intent in a structure used to describe attributes of that entity, such as an inode. As known, an inode is a data structure that describes a file system object, e.g., a file or directory. The update intent may include a unique identifier associated with the file system operation. Further, the update intent in an inode may specify each file system object participating in the transaction. In addition, the list of file system objects is ordered according to the order the operations should be performed to complete the file system operation.

After writing an update intent for a given transaction to the inodes, the process performs the transaction on each file system object affected by the operation. After completing the operation specified in each inode, the process removes the update intent from the inode.

Inserting an update intent prior to performing a transaction and removing the update intent when finalizing the transaction ensures file system consistency, particularly in cases where a node fails during any stage of the transaction. In one embodiment, a node may complete or abort a transaction left in an intermediate state due to failure of another node performing the transaction.

For example, consider a case where a node performs a rename operation that involves file system entities A, B, and C, where A is a source directory file handle, B is a destination directory file handle, and C is a file handle to the file being renamed. Assume that the process executing in the node has inserted an update intent in inodes corresponding to entities A, B, and C describing the rename operation to be performed. Further, assume that the node completes updating entity A but crashes before (or while) finalizing entity B. At the point of failure, the inode for entity A no longer stores the update intent associated with the rename operation, but file handles B and C still have an update intent because the node did not complete the rename operation. When another node accesses entities B or C, the node detects that the file system handles have an update intent from the incomplete transaction.

In one embodiment, when a node detects an update intent in an inode, the node can either complete or abort the incomplete transaction associated with that update intent. To so do, the node identifies the sequence of inodes referenced by the update intent. Doing so allows the node to determine which inodes were part of an incomplete transaction. Once identified (and after obtaining a ticket and lock on that set of inodes), the node can determine whether the incomplete transaction should be completed or abandoned.

To do so, the node evaluates which (if any) of the inodes store an update intent associated with the incomplete transaction (as identified using a transaction-specific identifier in the update intent). If the operation was not fully prepared at the time it was interrupted, then one (or more) nodes at the end of the sequence will not store an update intent. In such a case, the operation is abandoned and the update intent is simply removed from all the inodes associated with the transaction. If all of the inodes have an update intent, then the operation was interrupted after being fully prepared, but before being committed. In this case, the failed operation is rolled forward. If one (or more) nodes at the beginning of the sequence do not have an update intent, then the operation was interrupted after being prepared and after being partially performed by the nodes at the beginning of the sequence which do not have an update intent. In this case, the operation can be completed by performing the operation specified by the update intent in the relevant inodes at the end of the sequence.

Advantageously, the techniques described herein provide consistency in a distributed file system. The two-level locking scheme allows nodes to access and modify file system entities concurrently. Further, writing an update intent to inodes participating in a transaction provides a commit mechanism that does not rely on any centralized database or journaling techniques to ensure transaction consistency. As a result, the distributed file system disclosed herein may scale more efficiently than distributed systems that maintain transaction databases and journals.

Note, embodiments are described below using a distributed secondary storage system as a reference example of a cluster which exports a distributed file system to clients. However, one of ordinary skill in the art will recognize that the distributed file system described herein may be adapted for use with a variety of distributed computing clusters.

FIG. 1 illustrates an example computing environment 100, according to one embodiment. As shown, the computing environment includes a primary storage server 105 and a cluster 122. As shown, the cluster 122 includes multiple computing servers 110 that host and manage a distributed service (e.g., secondary storage services). The primary storage server 105 and secondary storage servers 110 are each connected via a network 120. The primary storage server 105 and secondary storage servers 110 may provide storage for a data center.

In particular, the cluster 122 of secondary storage servers 110 form a distributed file system which provides backup storage and services to the primary storage server 105. Illustratively, each secondary storage server 110 (or "node") of the distributed file system includes bridge components 112 and data gathering components 114. The bridge components 112 may provide software applications that allow external clients to access each node. The data gathering components 114 are generally configured to retrieve data from primary storage server 105 (e.g., by communicating with the primary storage server 105 using a backup protocol). Further, each node includes one or more hard disk drives (HDDs) 116 and solid-state drives (SSDs) 118 for storing data from primary storage server 105. The SSDs 118 increase the performance running secondary storage transactions, such as serial-write transactions. In one embodiment, the distributed file system is the SnapFS® developed by Cohesity, Inc.

In one embodiment, distributed cluster 122 may expose backup data to applications 127 on clients 125. For example, assume the distributed cluster 122 provides a backup of a file system on the primary storage server 105. In such a case, the cluster 122 could create a snapshot of a file system on the primary storage server 105 every few minutes. Further, the cluster 122 could expose a clone of one of the snapshots to applications 127. For example, the cluster 122 could export a clone as an NFS mount point (or SMB, CIFS, etc.), allowing the clients 125 to mount the snapshot over a directory in the local file system of the client 125. In such a case, the bridge components 112 may respond to requests from clients 125 to perform NFS operations (or operations for SMB, CIFS, etc.) on the mounted directory (e.g., lookup, create, read, write, rename, remove, etc.). As described below, nodes 110 of the cluster 122 manage concurrent access to the clone made by NFS clients using both node level locks (tickets) and local process locks on inodes touched by a given file system operation. That is, a request from a client 125 may be directed to any of the nodes 110. Additionally, the nodes 110 maintain a consistent distributed file system by writing an update intent to each inode participating in a given file system operation. Doing so allows the cluster 122 to maintain a consistent file system state, even when a node fails in the middle of a file system operation.

Figure 2:
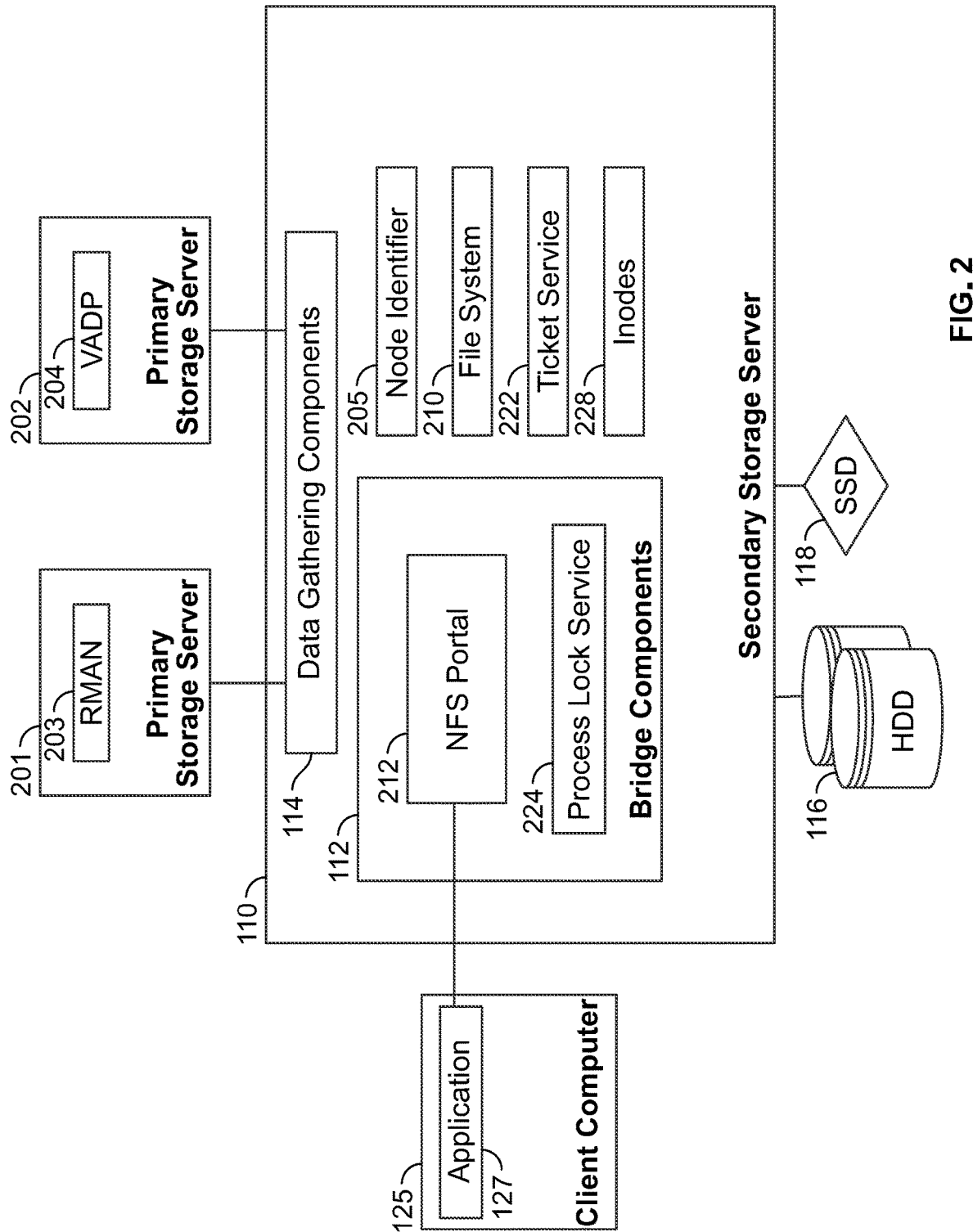
FIG. 2 illustrates an example secondary storage server, according to one embodiment.

FIG. 2 further illustrates a secondary storage server 110, according to one embodiment. As shown, the secondary storage server 110 includes bridge components 112, data gathering components 114, and a node identifier 205. The node identifier 205 is a distinct value that may be based on the MAC address of the secondary storage server 110.

As stated, the data gathering components 114 communicate with primary storage servers in the computing environment 100. Illustratively, the data gathering components 114 may retrieve data from primary storage servers 201 and 202, where each primary storage server 201 and 202 execute backup protocols such as recovery manager (RMAN) 203 and vStorage APIs for Data Protection (VADP).

The secondary storage server includes a file system 210. The file system 210, in conjunction with the file systems of other secondary storage servers in the cluster, forms a distributed system used to store backup data from the primary storage services. For example, assume the bridge components 112 receive a virtual machine disk (VMDK) file from the backup data gathering components 114. In such a case, the bridge components 112 writes the VMDK file to disk storage 160. In addition, file system metadata is stored in SSD 118. However, as a VMDK file can be quite large (e.g., terabytes), bridge components 112 may store the VMDK file as set of smaller blobs (binary large object) files managed by a blob manager, each having a set of chunks (e.g., approximately 8 KB each). Backup data below a given size threshold (e.g., files less than 256K bytes) could be stored in the SSD 118 directly along with the file system metadata.

Once stored, the bridge components 112 may expose file system 210 to clients through file system protocols, such as NFS mount point 212. Further, the bridge components 112 may include processes for performing NFS operations requested by clients.

Further, the secondary storage server 110 may include a ticket service 222. The ticket service 222 is an in-memory distributed lock manager that issues locks ("tickets") to requesting nodes. In one embodiment, nodes in the cluster elect a "leader" ticket service 222 that issues tickets for entities of the file system 210. Further, the ticket services 222 executing on the remaining nodes are "slave" ticket services 222. The leader ticket service 222 issues a ticket to a requesting node (or queues the request). A ticket provides a node-level lock on a file system object such as a file or directory. A node that holds a ticket on a file has access to that entity. When the node acquires a ticket from the leader ticket service 222, the leader ticket service 222 pins the ticket. While a ticket is pinned, other processes cannot obtain the ticket. When the node finishes performing a given operation, the node unpins the ticket. The corresponding slave ticket service 222 caches the ticket until requested by the leader ticket service 222 (e.g., when another node requests the ticket).

Further, the ticket may provide either shared or exclusive access. For instance, a node 110 may request an exclusive ticket to files involved in a write operation. In contrast, a shared ticket may be issued to multiple nodes, allowing multiple read operations to occur concurrently.

The bridge components 112 may include a process-wide (or "local") lock service 224. The process-wide lock service 224 issues a lock to file system objects touched by an operation performed by the node. That is, if a node has a process-wide lock on a set of inodes participating in a file system operation, then other processes on the node 110 are prevented from accessing that set of inodes until the operation is complete, and the local process locks are released. Like the tickets (or node-level) locks, locks issued by the process-wide lock service 224 can be shared or exclusive.

Files and directories in the file system 210 are each associated with an inode 228. As known, an inode is a data structure that stores file system attributes and metadata describing a file or directory. For example, an inode 228 for a file may include information such as a file name, file permissions, a date the file was last modified, etc. In one embodiment, the bridge components 112 may add an update intent in inodes 228 touched by a given file system operation.

An update intent provides information about an operation to be performed on the file system object corresponding to a given inode 228. Prior to initiating a file system operation, the bridge components 112 insert an update intent into the inode 228 of each file system object that will be modified during the operation. After the bridge process modifies a file system object, the bridge components 112 remove the update intent from the corresponding inodes 228. Doing so allows other nodes that access the entity to detect whether a node had failed while performing an operation. More specifically, if a node fails (or a bridge component 112 fails) while performing a file system operation that modifies multiple file system objects (e.g., an NFS rename), some of the inodes 228 participating in the operation will have an update intent related to the interrupted operation. When bridge encounters an inode with a "stale" update intent (typically as part of performing a current file system operation that touches that inode), the bridge process either completes or aborts the interrupted operation, depending on the progress of that operation when the previous node failed. Further, in one embodiment, a background process may identify inodes 228 that have an update intent from incomplete operations.

Figure 3:
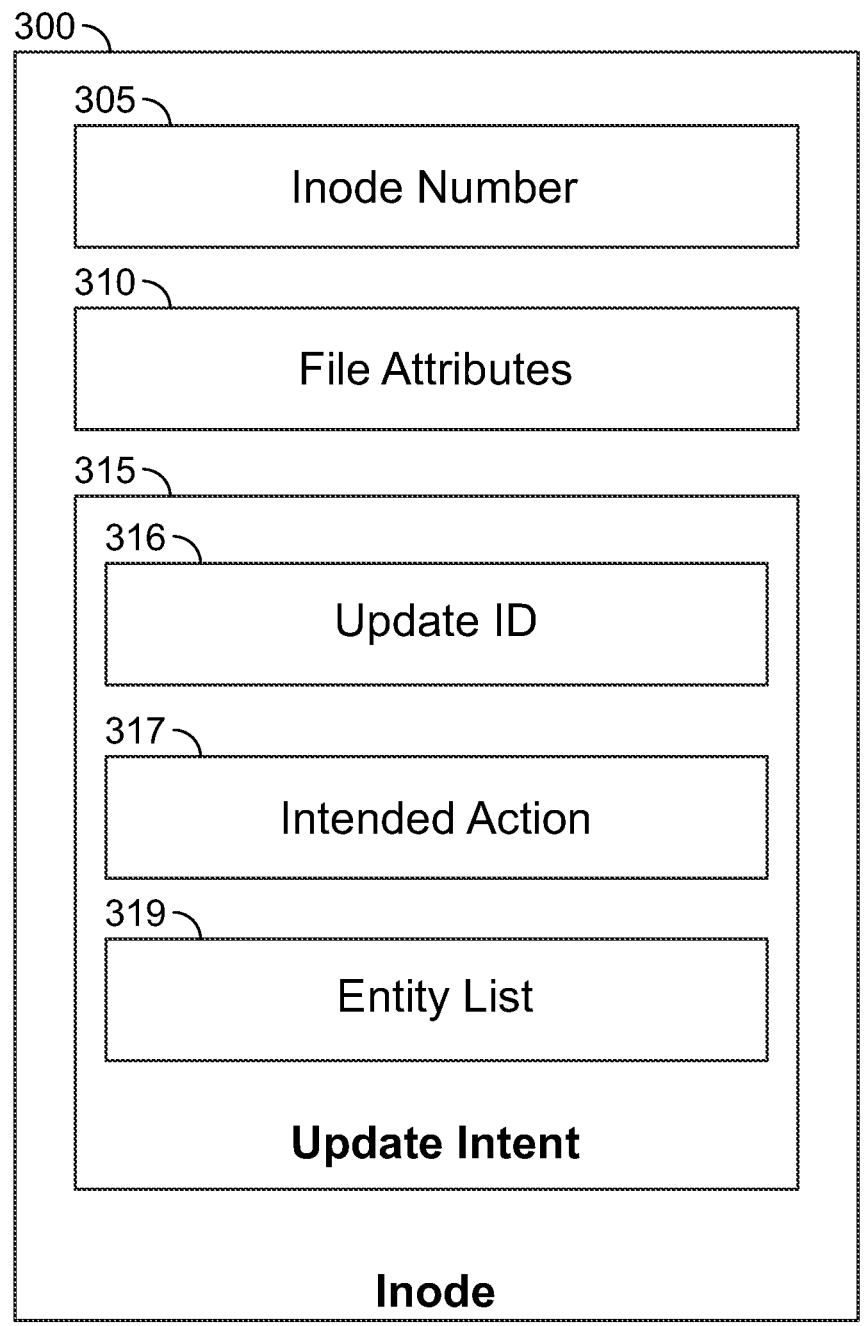
FIG. 3 illustrates an inode for an object in a distributed file system, according to one embodiment.

FIG. 3 illustrates an inode 300 for objects in a distributed file system, according to one embodiment. As shown, the inode 300 includes an inode number 305, file attributes 310, and an update intent 315. The inode number 305 provides a distinct identifier for each object in the file system. File attributes 310 contain details about the file, including file permissions, ownership, size, location of data blocks on disk, etc.

In one embodiment, update intent 315 stores information about a pending operation to be performed on the file system object corresponding to inode 300. A node adds an update intent 315 in an inode 300 of a file system entity that the node intends to modify. For example, assume a client sends a NFS delete operation request to delete a file "yyy" located in a directory "c". In response, the bridge process obtains a node-level ticket and a process lock on the inodes of these entities. Once obtained, the bridge process inserts an update intent 315 in the inode 300 of the of the directory "c" and in the inode of the file "yyy".

In one embodiment, the update intent 315 includes an update ID 316, an intended action 317, and an entity list 319. The update ID 316 provides a distinct identifier for each file system transaction that touches multiple inodes. Further, the bridge process uses the update ID 316 to distinguish one file system transaction from another.

The intended action 317 specifies an operation performed as part of a common transaction. Continuing the previous example, the intended action 317 in the update intent 315 for file "yyy" and directory "c" is a delete operation on file "yyy".

Further, the entity list 319 includes each inode participating in the transaction identified by the update ID 316. Continuing the previous example, the entity list 319 for the delete operation may include the inode number 305 of the inodes for directory "c" and file "yyy." In addition, the entity list 319 may specify an order in which the intended action should be performed. For example, assume A is an inode for a directory where a file is being created and B is an inode for that file. If an operation occurs by creating B and inserting an update intent in B and then storing an update intent in A. In this situation, if the node crashes prior to storing the update intent in A, nothing in the entire file system would refer to B, thus orphaning B. Therefore a transaction is ordered by inserting the update intent in A first and then into B. Inserting the update intent in A first and B next ensures that if the node crashes prior to inserting the update intent in B, no such orphaning would occur. Conversely, assume that B were being deleted from A. In such a case, the sequence would be to first store the update intent in B and then store the update intent in A. Therefore, if the node crashes before inserting the update intent in A, B would not be orphaned (because A would still refer to B).

Figure 4:
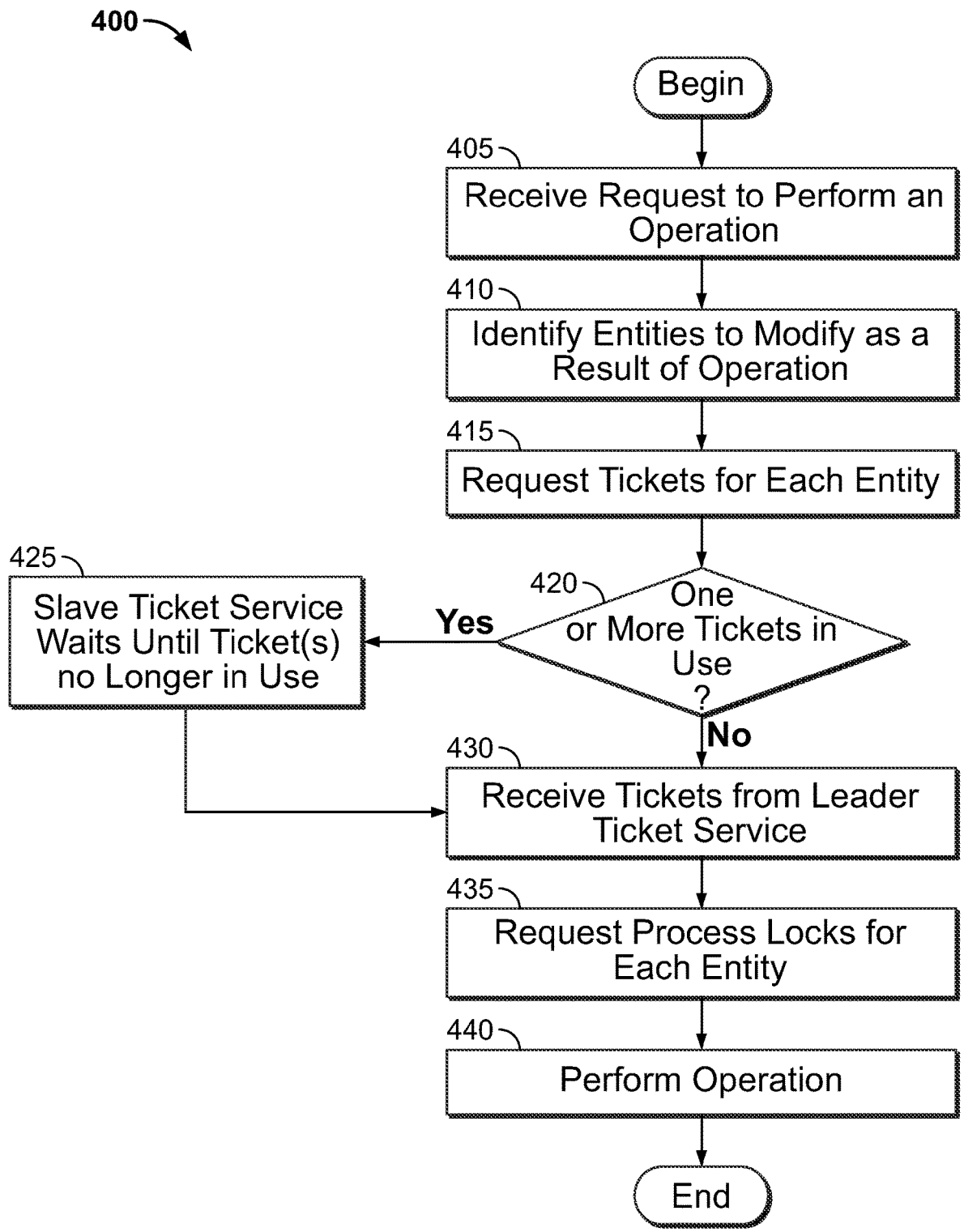
FIG. 4 illustrates a method for obtaining locks on file system objects, according to one embodiment.

FIG. 4 illustrates a method 400 for obtaining locks on file system objects modified during a transaction, according to one embodiment. As stated, prior to performing a file system operation, a bridge process executing on a node acquires a node-level ticket and a process-wide lock on each file system object modified by the file system operation.

As shown, method 400 begins at step 405, where a bridge process receives a request from a client to perform an operation. The request may reference a NFS file handle, such as a file handle for a directory. In turn, the bridge process is able to identify the inode of the file corresponding to the file handle. For example, assume that the node receives a request to rename a file named "yyy" to "zzz". The request may specify file handles for a source directory (i.e., the handle of the directory containing the file "yyy"), a file handle of a destination (i.e., a handle to where the renamed file "zzz" will be located), and the file "yyy". At step 410, the bridge process identifies file system objects modified by the operation.

At step 415, the bridge process requests, from the distributed ticket service an exclusive ticket for the file system objects identified at step 405. Continuing the previous example, the node requests tickets for exclusive access for the inode of the source directory, the inode of the destination directory, and the inode of the file being renamed. In one embodiment, the ticket services queues each request by the node for the respective entity. If the request of the node is at the front of the queue, the ticket service issues the respective ticket to the node.

At step 420, the ticket service determines whether requested tickets are currently being held by other nodes. If so, then at step 425, the slave ticket service 222 corresponding to the requesting node waits until the held tickets are released by the nodes holding the tickets. Otherwise, if the requested tickets are not currently being held by other nodes, then at step 430, the node receives the tickets from the ticket service. The bridge process pins the tickets. While a given ticket is pinned to a process, the leader ticket service cannot take away the ticket, which allows the bridge process to assume that it owns the tickets and has complete access to the inodes. In this case, the node receives tickets for exclusive access to the inodes.

At step 435, the bridge process requests a process-wide lock for each of the file system objects from the process-wide lock service executing on the node performing the requested file system operation. As stated, process-wide locks ensure that processes running on one node do not have access to the locked objects while the bridge process is performing the requested operation. For example, in this case, the node requests process-wide locks for the source directory, the destination directory, and the file "yyy". At step 440, the bridge process performs the operation. FIGS.

5 and 6 further illustrate examples of file system operations being performed. Once the operation is complete, the bridge process unpins the tickets. The slave ticket service running on the node caches the tickets, which allows the elected leader ticket service to retrieve the tickets when requested by a remote node.

Figure 5:
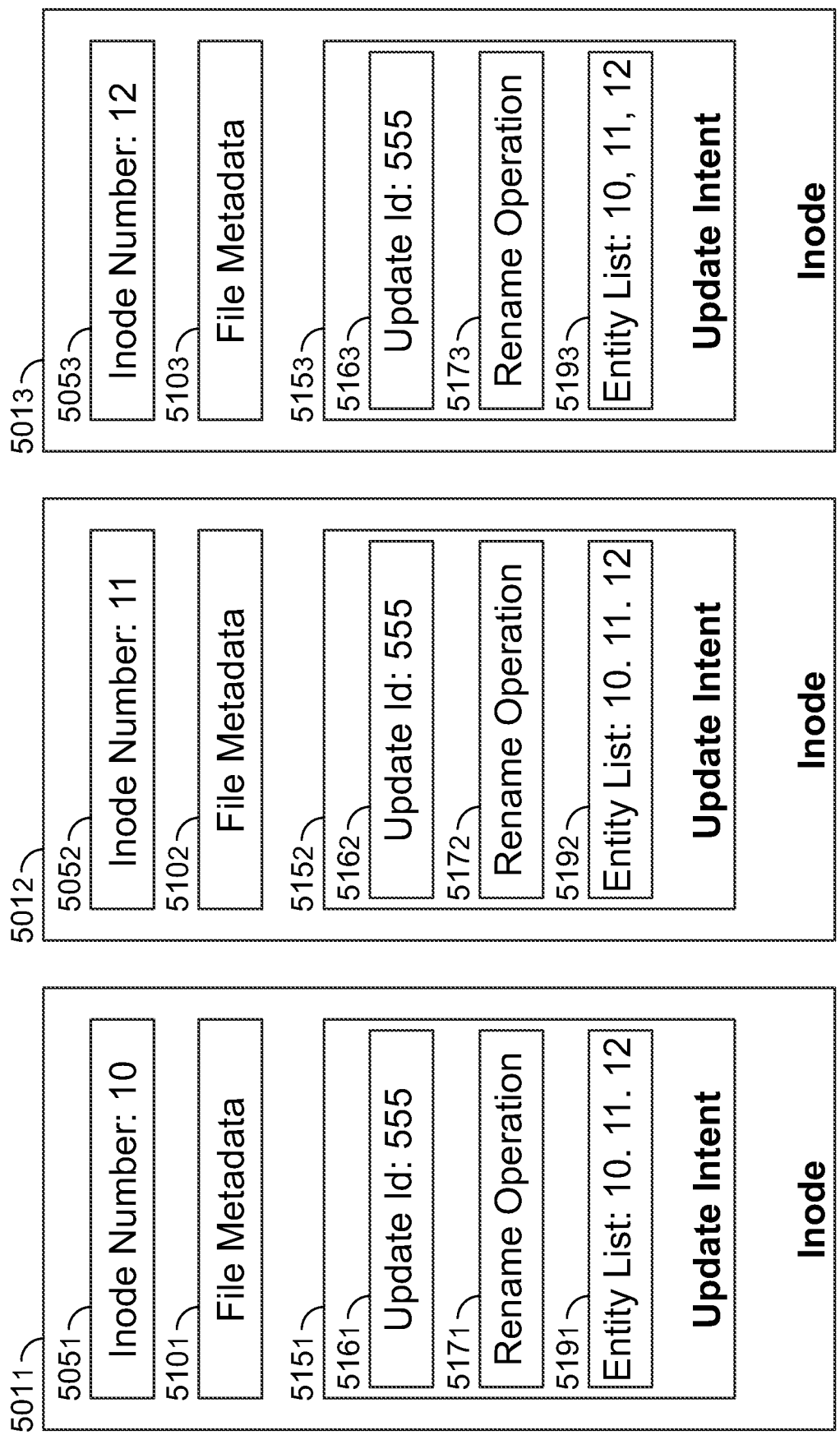
FIG. 5 illustrates example of objects modified by a file system operation, according to one embodiment.

FIG. 5 illustrates an example system operation performed by a node in a distributed file system, according to one embodiment. Specifically, FIG. 5 illustrates an example of a rename operation. As shown, inodes $501_{1-3}$ correspond to a source directory, destination directory, and the filename "yyy," respectively. In this example, inode numbers $505_{1-3}$ of each respectively entity are 10, 11, and 12. The source directory and destination directory correspond to different directories and therefore are associated with separate inodes. Further, the file metadata $510_{1-3}$ each describe attributes of the entities (e.g., permissions, whether the entity is a file or directory, etc.).

Prior to performing the rename operation, the node inserts an update intent $515_{1-3}$ corresponding to the operation to each of the inodes $501_{1-3}$. The update ID 516 for each of the inodes is 555. The entity list $519_{1-3}$ specifies that the entities with inode numbers $505_{1-3}$ will be modified by the intended rename operation.

The bridge process modifies each entity according to the rename operation. After modifying a given entity or inode, the bridge process removes the update intent 515 from the corresponding inode 501. Therefore, if the bridge (or node) fails while performing this transaction, another node may be able to complete or abort the intended operation after detecting that the update intent 515 still present in any of the inodes $501_{1-3}$.

Further, to ensure a consistent file system, the node may modify entities in a particular order. For example, in a create operation where a file is created in a particular directory, the node may update the directory prior to associating the new file with the directory. As another example, in a delete operation where a file is deleted from a particular directory, the inode for the file is deleted first.

Figure 6:
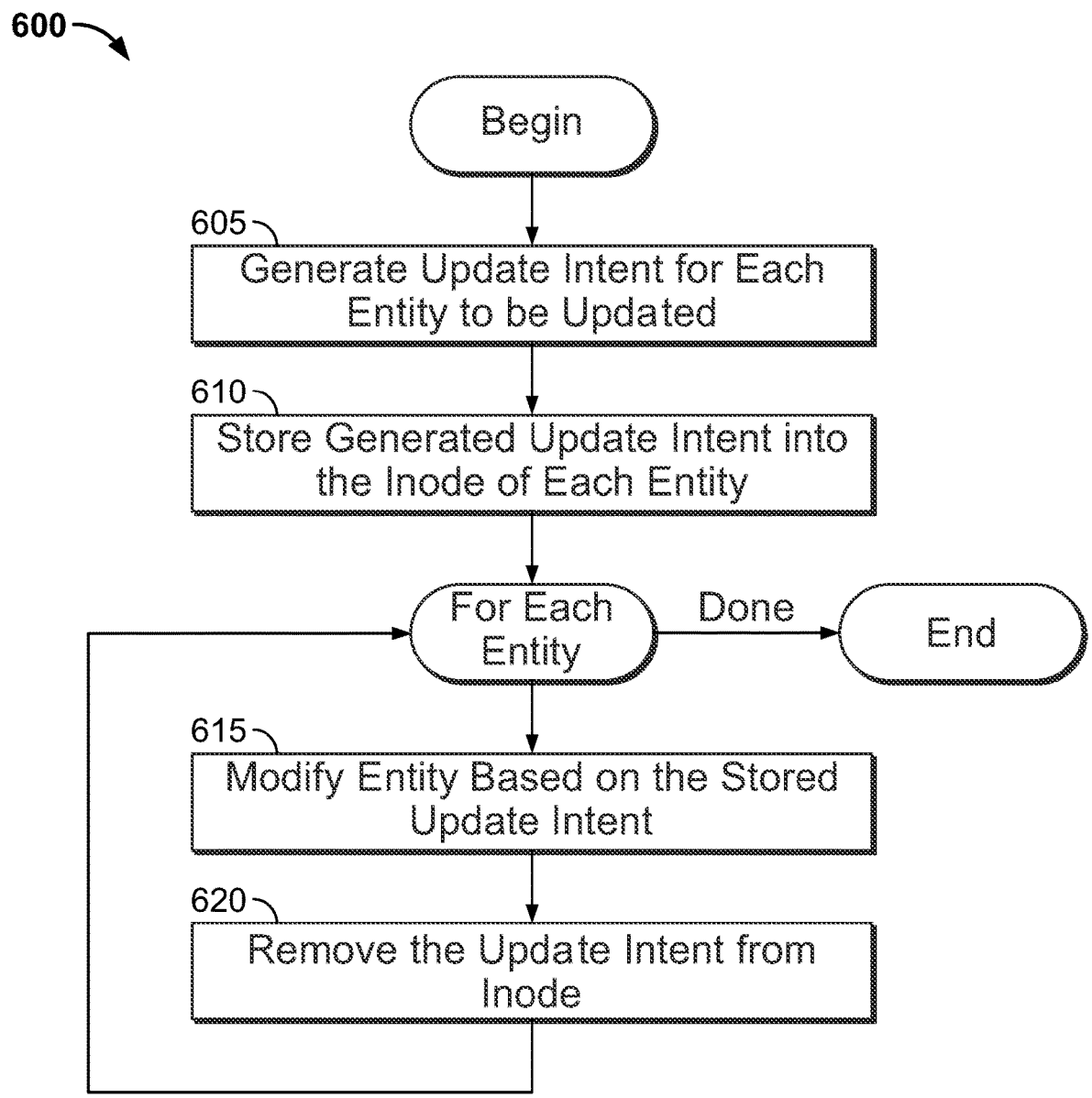
FIG. 6 illustrates a method for atomically updating file system objects, according to one embodiment.

FIG. 6 illustrates a method 600 for atomically performing file system operations in a distributed file system, according to one embodiment. As stated, a bridge process executing on a node may perform NFS operations in response to requests from clients. Of course, the distributed file system may use a variety of other file system protocols. Assume that the bridge process performing a given operation obtained a node-level ticket and a process-wide lock on each of the file system entities being modified by the operation.

Method 600 begins at step 605, where the bridge process generates an update intent for each inode participating in the transaction. Further, at step 610, the node inserts the update intent in each inode. Steps 605 and 610 act as a prepare phase for the transaction.

At step 620, the bridge process modifies the entity based on the update intent of the associated inode. After the bridge process modifies the entity, at step 625, the node removes the update intent from the inode. Steps 620 and 625 act as a commit phase for the transaction.

Figure 7:
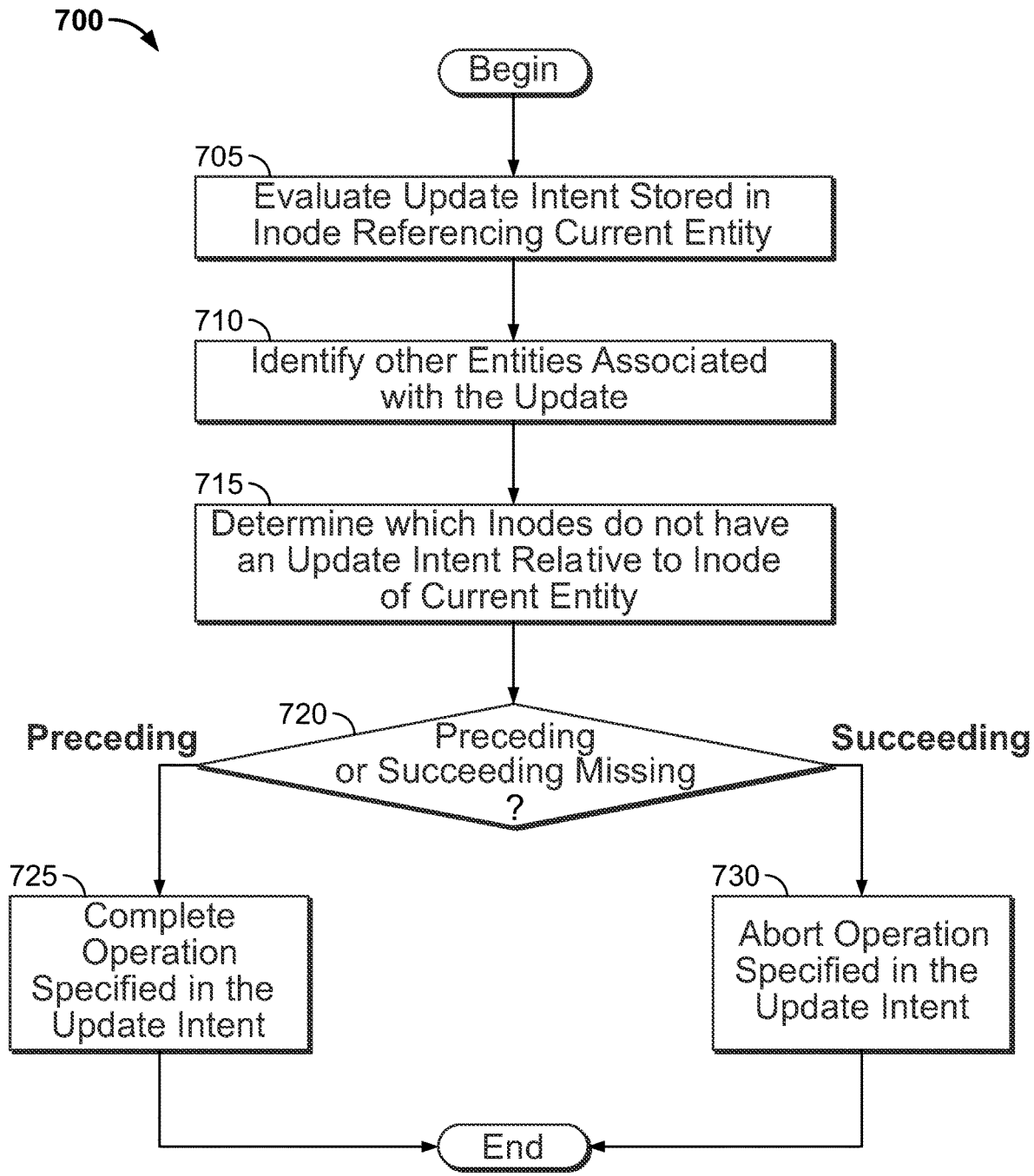
FIG. 7 illustrates a method for committing or aborting a file system transaction left in an intermediate state due to a node failure, according to one embodiment.

FIG. 7 illustrates a method 700 for committing or aborting an incomplete transaction, according to one embodiment. In some instances, the bridge process (or node) may fail while performing a transaction that modifies multiple file system objects. For example, assume that the node performing the rename operation discussed above fails after completing the update on the inode of the source directory. That is, the bridge process has not yet modified the entities corresponding to the destination directory and file "yyy". In such a case, the inodes of the destination directory and the file "yyy" still store an update intent corresponding to the rename operation. During normal execution in the distributed secondary storage cluster, another node may access either of the inodes for the destination directory or the file, e.g., to perform a file system operation that touches these inodes. If the bridge process of that node detects that one of the inodes for a current operation and stores an update intent, then the current operation is aborted. The bridge process aborts and releases the locks on the file system objects to be modified in the operation. The bridge process may send the inodes to a "fixer" process executing on the node that either completes or aborts the prior operation depending on the state of the inodes involved in that operation.

Method 700 begins at step 705, where the node evaluates the update intent in the inode). Assume, for this discussion, that when the bridge components 112 initiate an operation and identifies a "stale" update intent in an inode participating in that transaction, the bridge component 112 sends the metadata to the fixer process. The fixer process determines the update ID, the operation that was to be performed, and a sequence of inodes included in the operation. Continuing the previous example, assume that the current entity corresponds to the entity with inode $501_2$ with inode number 11 from FIG. 5. The fixer process identifies that the other file system objects have inode numbers of 10 and 12.

At step 710, the fixer process accesses the other entities associated with the update. The fixer process requests a node-level ticket from the ticket service for each entity in the list of entities in the node with a "stale" update intent. After acquiring the tickets, the fixer process also requests process-wide locks for the same entities.

At step 715, the fixer process determines which inodes do not have an update intent relative to the inode with the stale update operation. In this case, the entity with inode number 10 (i.e., the source directory file handler) does not have an update intent. At step 720, the fixer process determines whether the entities without an update intent come before or after the inode with the stale update intent. The absence of an update intent in a preceding inode indicates that the previous node had already finalized the update to the entity referenced by that inode. In contrast, the absence of an update intent in a succeeding entity implies that the node had failed while preparing for the operation.

If the inode or inodes without an update intent precede the current entity in sequence, then at step 725, the node completes the operation specified in the update intent. That is, because the previous node had already completed modifying the entities, the fixer process should roll forward with the rest of the operation specified in the update metadata. However, if the inodes without an update intent come after the current entity in sequence, then at step 730, the fixer process aborts the intended operation by removing the update intent from the inodes following the inode with the "stale" update intent. Continuing the previous example, the inode for the source directory no longer has an update intent. Because the source directory precedes the current entity (i.e., the destination directory) in sequence, the fixer process completes the rename operation.

Figure 8:
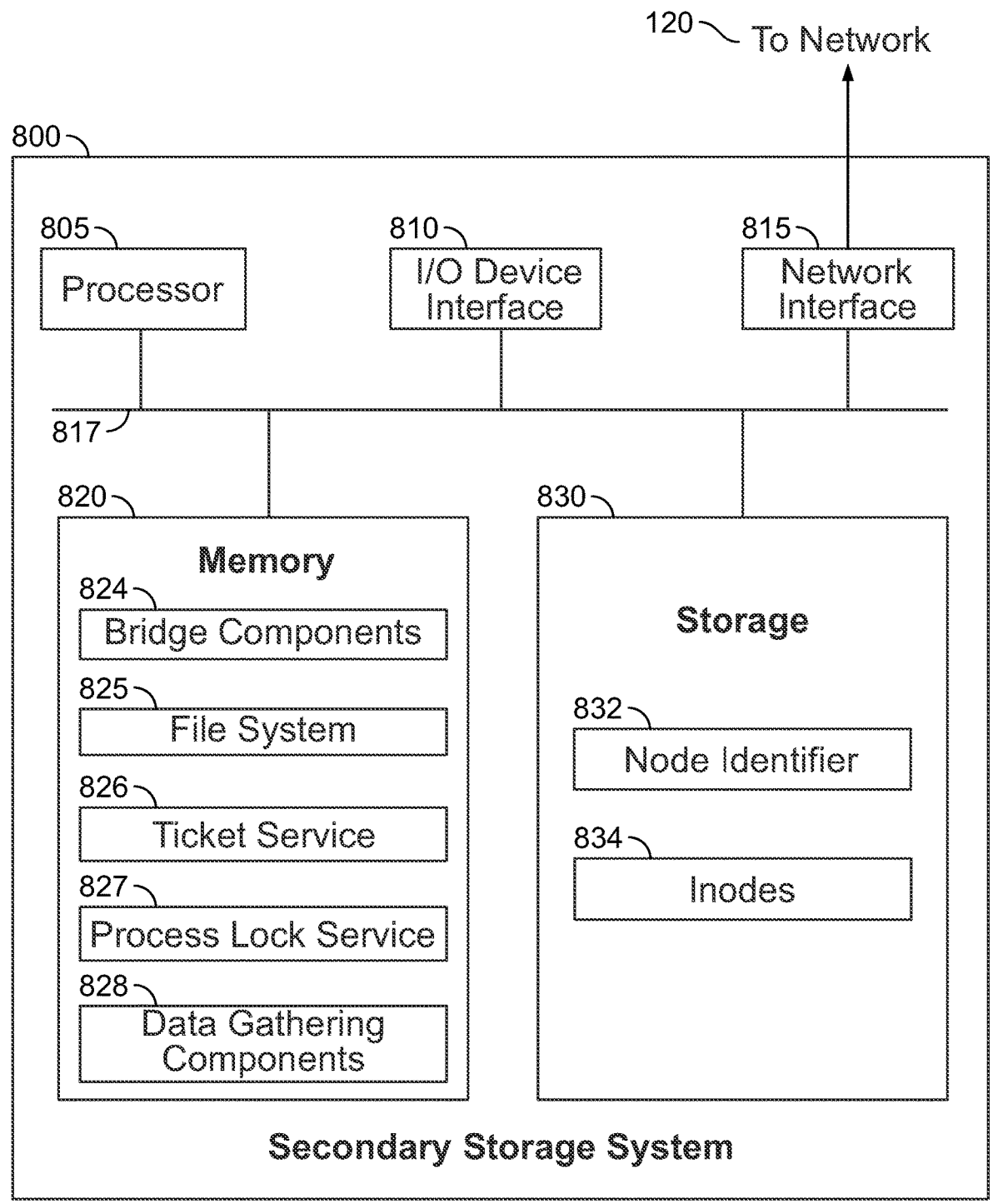
FIG. 8 illustrates a node in a distributed file system, according to one embodiment.

FIG. 8 illustrates an example secondary storage server 800 configured to allocate VIP addresses among other secondary storage servers in a distributed system, according to one embodiment. As shown, computing system 800 includes, without limitation, a central processing unit (CPU) 805, a network interface 815, a memory 820, and storage 830, each connected to a bus 817. Server 800 may also include an I/O device interface 810 connecting I/O devices 812 (e.g., keyboard, display and mouse devices) to the computing system 800. Further, in context of this disclosure, the computing elements shown in computing system 800 may correspond to a physical computing system (e.g., a system in a data center) or may be a virtual computing instance executing within a computing cloud.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 815, and memory 820. Note, CPU 805 is included to be representative of a single CPU, multiple CPUs, a single CPU having multiple processing cores, and the like. Memory 820 is generally included to be representative of a random access memory. Storage 830 may be a disk drive storage device. Although shown as a single unit, storage 830 may be a combination of fixed and/or removable storage devices, such as fixed disc drives, removable memory cards, or optical storage, network attached storage (NAS), or a storage area-network (SAN).

Illustratively, memory 820 includes bridge components 824, and data gathering components 826. The bridge components 824 provide a file system architecture for the distributed secondary storage system. The bridge components 824 may perform operations on the file system in response to NFS requests sent by clients. The data gathering components 826 include modules that allow the secondary storage server 800 to communicate with primary storage servers and retrieve copies of data from the primary storage servers.

The memory 820 further includes, without limitation, a file system 825, a ticket service 826, and a process-wide lock service 827. The file system 825 collaborates with the file systems of other secondary storage servers in the cluster to form a distributed system used to store backup data from the primary storage services. The bridge components 824 expose the file system 825 to clients through file system protocols, such as NFS, SMB, CIFS, and iSCSI. The ticket service 826 is an in-memory distributed lock manager that issues tickets to requesting nodes. The tickets provide a node-level lock to entities of the file system 825. The process-wide lock service 827 issues process-wide locks for an entity that is specific to an operation performed by the secondary storage system 800. That is, process wide locks are local in scope to the secondary storage system 800. Both the tickets and the process-wide locks may grant either shared or exclusive access to a particular entity.

The storage 830 includes a node identifier 832. The node identifier 220 is a distinct value that may be based on the MAC address of the secondary storage server 110. The inodes 834 are data structures for the file and directory entities that store metadata describing file system attributes for each entity. Further, when performing a given operation on an entity, an inode 834 may store an update intent describing the update to be performed.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:
1. A method, comprising:
  identifying a plurality of file system data structures to modify to perform a file system operation;
  obtaining, by a computing node of a distributed file system, a corresponding node-level lock for each of the plurality of file system data structures;

obtaining, by the computing node of the distributed file system, a corresponding process-wide lock for each of the plurality of file system data structures; and performing the file system operation, comprising:

determining that the file system operation corresponds to creating a file in a directory:

storing a first update intent in a first inode associated with the directory of a file system data structure of the plurality of file system data structures;

storing a second update intent in a second inode associated with the file after the storing of the first update intent; and in the event that the second inode crashes after the first update intent is stored and before the second update intent is stored, determining that the file system operation has not been performed successfully.

2. The method of claim 1, wherein the plurality of file system data structures are a plurality of inodes.

3. The method of claim 1, further comprising receiving a request to perform the file system operation.

4. The method of claim 3, wherein the request specifies a source directory, a destination directory, and a file handle.

5. The method of claim 1, wherein obtaining the corresponding node-level lock for each of the plurality of file system data structures includes requesting, from a distributed lock service, the corresponding node-level lock for each of the plurality of file system data structures.

6. The method of claim 5, wherein obtaining the corresponding node-level lock for each of the plurality of file system data structures further includes receiving from the distributed lock service, the corresponding node-level lock for each of the plurality of file system data structures.

7. The method of claim 5, wherein obtaining the corresponding node-level lock for each of the plurality of file system data structures further includes waiting for the corresponding node-level lock for each of the plurality of file system data structures in the event at least one of the corresponding node-level lock for each of the plurality of file system data structures is being used by another computing node of the distributed file system.

8. The method of claim 1, wherein obtaining the corresponding process-wide lock for each of the plurality of file system data structures includes requesting from a process-wide lock service the corresponding process-wide lock for each of the plurality of file system data structures.

9. The method of claim 1, wherein performing the file system operation includes generating a corresponding update intent for each of the plurality of file system data structures.

10. The method of claim 9, wherein performing the file system operation further includes storing the corresponding generated update intent into each of the plurality of file system data structures.

11. The method of claim 10, wherein the corresponding generated update intent are stored into each of the plurality of file system data structures in a particular order.

12. The method of claim 10, wherein performing the file system operation further includes modifying each of the plurality of file system data structures based on the corresponding generated update intent.

13. The method of claim 12, wherein performing the file system operation further includes removing the corresponding generated update intent after modifying a file system data structure.

14. A computer program product embodied in a non-transitory computer readable medium and comprising computer instructions for:

identifying a plurality of file system data structures to modify to perform a file system operation;

obtaining, by a computing node of a distributed file system, a corresponding node-level lock for each of the plurality of file system data structures;

obtaining, by the computing node of the distributed file system, a corresponding process- wide lock for each of the plurality of file system data structures; and performing the file system operation, comprising:

performing one or more of the following:

A) in the event that the file system operation corresponds to creating a first file in a first directory:

storing a first update intent in a first inode associated with the first directory of a file system data structure of the plurality of file system data structures;

storing a second update intent in a second inode associated with the first file after the storing of the first update intent; and in the event that the second inode crashes after the first update intent is stored and before the second update intent is stored, determining that the file system operation has not been performed successfully; and/or B) in the event that the file system operation corresponds to deleting a second file from a second directory:

storing a first update intent in a first inode associated with the second file;

storing a second update intent in a second inode associated with the second directory after the storing of the first update intent; and in the event that the second inode crashes after the first update intent is stored and before the second update intent is stored, determining that the file system operation has not been performed successfully.

15. The computer program product of claim 14, wherein the plurality of file system data structures are a plurality of inodes.

16. The computer program product of claim 14, further comprising computer instructions for receiving a request to perform the file system operation.

17. The computer program product of claim 14, wherein obtaining the corresponding node-level lock for each of the plurality of file system data structures includes requesting, from a distributed lock service, the corresponding node-level lock for each of the plurality of file system data structures.

18. The computer program product of claim 17, wherein obtaining the corresponding node-level lock for each of the plurality of file system data structures further includes receiving from the distributed lock service, the corresponding node-level lock for each of the plurality of file system data structures.

19. The computer program product of claim 14, wherein obtaining the corresponding node-level lock for each of the plurality of file system data structures further includes waiting for the corresponding node-level lock for each of the plurality of file system data structures in the event at least one of the corresponding node-level lock for each of the plurality of file system data structures is being used by another computing node of the distributed file system.

20. A method, comprising:
identifying a plurality of file system data structures to modify to perform a file system operation;
obtaining, by a computing node of a distributed file system, a corresponding node-level lock for each of the plurality of file system data structures;
obtaining, by the computing node of the distributed file system, a corresponding process-wide lock for each of the plurality of file system data structures; and
performing the file system operation, comprising:
    determining that the file system operation corresponds to deleting a file from a directory:
        storing a first update intent in a first inode associated with the file;
        storing a second update intent in a second inode associated with the directory after the storing of the first update intent; and
        in the event that the second inode crashes after the first update intent is stored and before the second update intent is stored, determining that the file system operation has not been performed successfully.

\* \* \* \* \*